Feb. 21, 1950          A. ALK          2,498,477
DAYLIGHT DEVELOPING APPARATUS FOR PHOTOGRAPHIC FILMS
Filed May 18, 1948          3 Sheets-Sheet 1
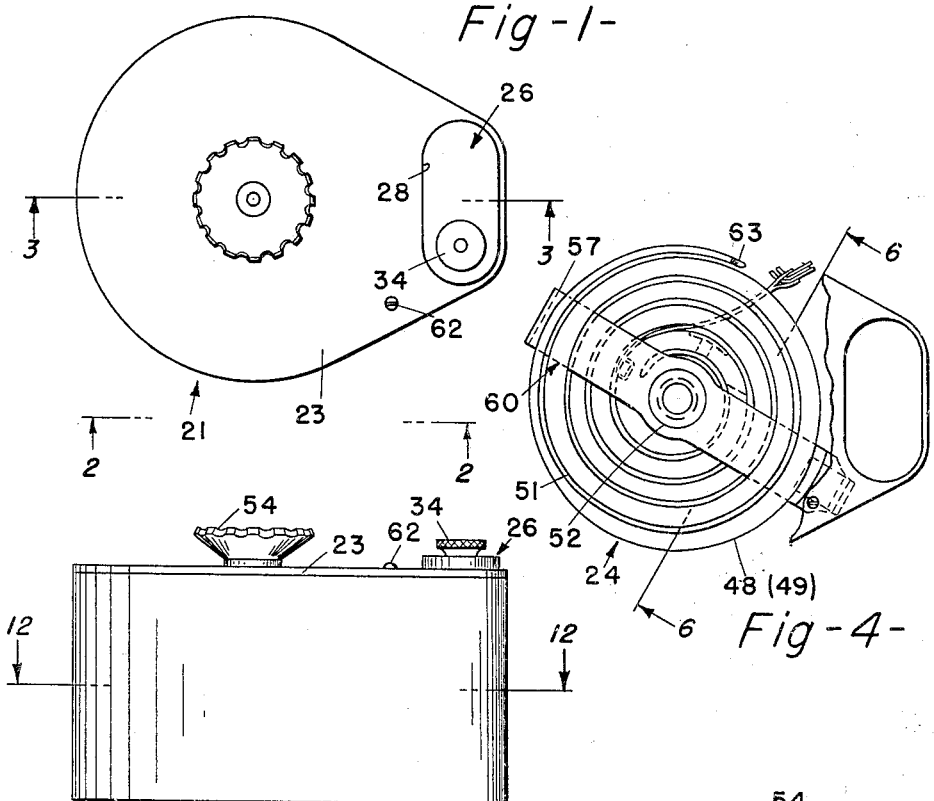
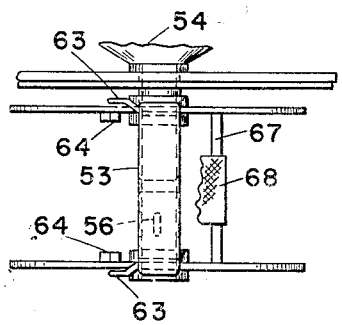
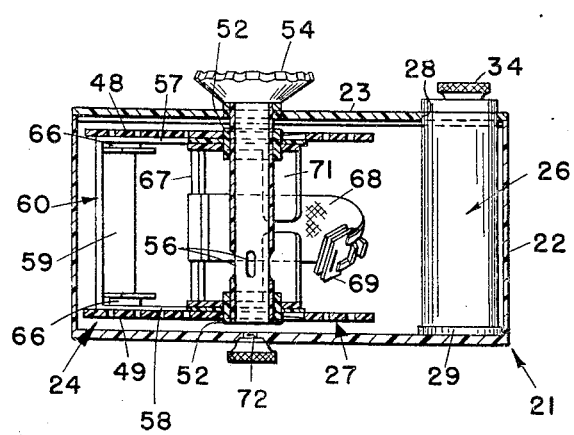
INVENTOR:
ABRAHAM ALK
BY
his Agent Feb. 21, 1950 A. ALK 2,498,477
DAYLIGHT DEVELOPING APPARATUS FOR PHOTOGRAPHIC FILMS
Filed May 18, 1948 3 Sheets-Sheet 2
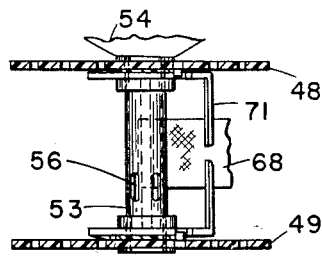
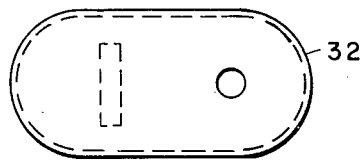
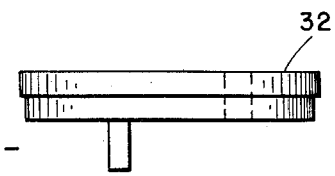
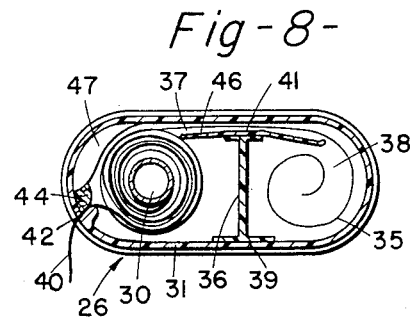
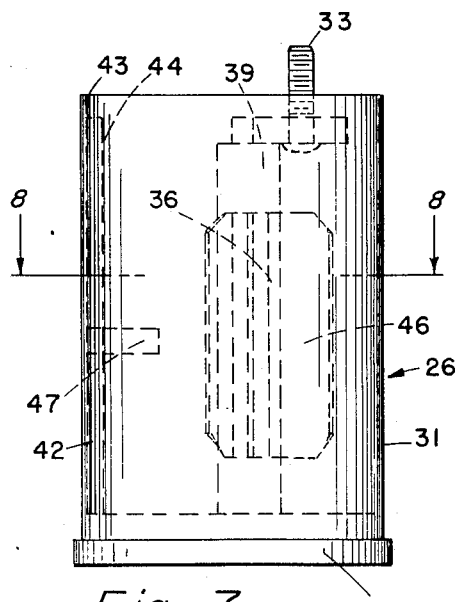
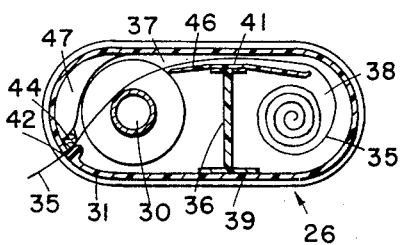
INVENTOR:
ABRAHAM ALK
BY
his Agent Feb. 21, 1950 A. ALK 2,498,477
DAYLIGHT DEVELOPING APPARATUS FOR PHOTOGRAPHIC FILMS
Filed May 18, 1948 3 Sheets-Sheet 3
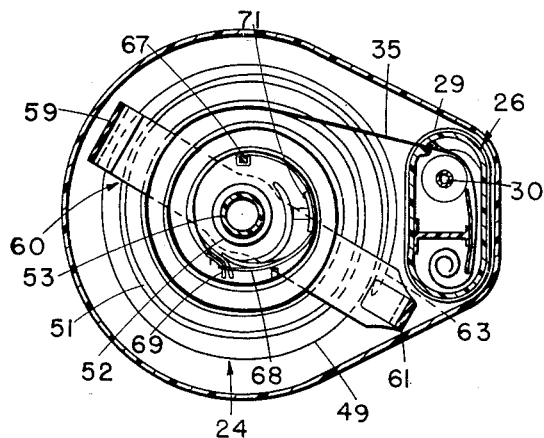
Fig -12-
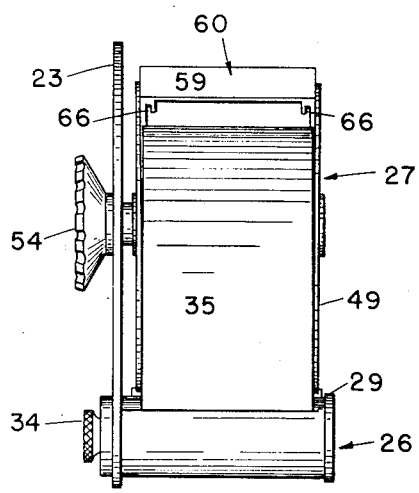
Fig -13-
INVENTOR·
ABRAHAM ALK
BY
*his Agent*

Patented Feb. 21, 1950

2,498,477

UNITED STATES PATENT OFFICE 2,498,477

DAYLIGHT DEVELOPING APPARATUS FOR PHOTOGRAPHIC FILMS

Abraham Alk, Paterson, N. J.

Application May 18, 1948, Serial No. 27,733

6 Claims. (Cl. 95—90.5)

The invention relates to photography and relates more particularly to daylight development tanks for photographic films.

Desirable features for daylight development tanks include facility in handling, the provision for light-tightness and the maintenance of the film portions in spaced relation to each other so that the film will be subjected to the influence of liquid chemicals uniformly throughout its exposed surface, and these features generally are obtained in daylight development tanks presently used; however, present tanks are deficient in desired simplicity for introducing the film into the tank and simplicity of handling by inexperienced operators.

It is therefore one of the principal objects of the invention to provide for a development tank that may efficiently be handled by unskilled persons.

Another object of the invention is the provision of mechanism for exposing the film to the influence of chemicals which mechanism automatically holds the film in spiralic disposition.

A further object of the invention is to provide a film holder wherein the film may be separated from the conventional flexible film cover strip without the possibility of light reaching the film surface.

A still further object of the invention is the provision of a daylight developing tank, the handling of which requires a minimum of steps each of which may be carried out easily and simply.

Further objects and advantages of the invention will be set forth in part in the following specification and in part will be obvious therefrom without being specifically referred to, the same being realized and attained as pointed out in the claims hereof.

With the above and other objects of the invention in view, the invention consists in the novel construction, arrangement and combination of various devices, elements and parts, as set forth in the claims hereof, one embodiment of the same being illustrated in the accompanying drawings and described in the specification.

In the accompanying drawings,

Fig. 1 is a plan view of a daylight film tank, in accordance with the invention;

Fig. 2 is a side elevational view thereof seen in the direction 2—2 of Fig. 1;

Fig. 3 is a sectional view through the tank casing taken along line 3—3 of Fig. 1, but showing some of the parts of the interior of the casing in elevation;

Fig. 4 is a fragmentary elevational plan view of the film supporting mechanism;

Fig. 5 is a side elevational view of the film supporting mechanism;

Fig. 6 is a fragmentary sectional view, partly in elevation, taken along line 6—6 of Fig. 4;

Fig. 7 is a side elevational view of the film holder, without cover;

Fig. 8 is a sectional view taken along line 8—8 of Fig. 7, but showing a film with cover strip disposed in the holder;

Fig. 9 is a side elevational view of the closure for the film holder;

Fig. 10 is a plan view of the closure, shown in Fig. 9;

Fig. 11 is a sectional view, similar to Fig. 8, but showing the film after removal of the film cover strip;

Fig. 12 is a sectional view taken along line 12—12 of Fig. 2, showing the interior of the entire development tank wherein a film is partially held by the film supports and partially held in the film holder; and Fig. 13 is an elevational view of the film supports and the film holder in the position shown in Fig. 12, but removed from the tank casing.

In carrying the invention into effect in one of the embodiments which has been selected for illustration in the accompanying drawings and for description in this specification, and referring now particularly to Figs. 1–4, there is provided a daylight film development tank, generally indicated at 21, that includes a tank structure 22 and a cover 23. The cover 23 is removably inserted in the structure 22 and all the parts of the mechanism on the interior of the tank are so connected to the cover 23 that they are removed from the tank together with the cover 23 when the latter is lifted therefrom. The tank as well as the cover are made of light-impermeable material, such as hard rubber, opaque plastic, metal, or the like.

The cover 23 is adapted to close the tank 21 light-tight and is held thereon by means of screws (not shown) or by other suitable holding means.

On the interior of the tank and secured to the under side of the cover 23 there is provided a film holding mechanism, generally indicated at 24, that includes a film holder 26 and a film carrier 27. The film holder 26 is removably inserted in an oval opening 28 of the cover 23 and includes a shoulder 29 which restricts insertion into and removal from the cover to be done from the underside thereof so that in order to separate the holder from the cover, the cover must first be removed from the tank structure 22 and thereafter the holder 26 may be removed from the opening 28.

The film holder 26 is best shown in Figs. 8–11 and includes a casing 31 that is open on top and a cover 32 for said casing that may be removably secured thereto by means of a screw 33 and a nut 34 or by any other suitable securing means. A partition or rib 36 is provided on the interior of the casing 31, separating said interior into two intercommunicating chambers 37 and 38. The partition 36 does not extend throughout the length of the casing 31 but only through a portion thereof as shown in broken lines in Fig. 7 and is connected to one side of the casing wall at 39 and extends across a major portion of the width of the casing interior to a point near the opposite wall to provide between that wall and said rib 36 a gap 41.

The casing 31 furthermore is provided in its wall with a slot 42, that is open on top at 43, to provide for communication between the chamber 37 and the exterior of the casing 31. In the chamber 37 and near the slot 42 there are provided light blocking means 44 made of felt or plastic or similar material to prevent entry of light into the casing 31 after it has been closed light tight by the cover 32.

A film guide, for instance in the form of a wedge or feather 46, is connected to the free end of the partition 36 and projects into the chamber 37 and is capable of guiding the film through the gap 41 into the chamber 38, as will presently be explained. The guide 46 furthermore extends into the chamber 38 to aid in winding the film into a roll in the chamber 38, as best shown in Fig. 8. A curved lug 47 is secured in the chamber 37 near the light blocking member 44 to provide for a curvature to guide the film when it is unrolled in the chamber 37.

An exposed film spool is introduced into the film holder 26 as follows: the film spool 30 carrying the film 35 and the flexible film cover strip 40 is placed in the chamber 37; at the same time the free end of the flexible cover strip 40 that is usually made of paper is inserted in the slot 42 through the open end 43 thereof. Thereafter the cover 32 is placed on the casing 31 and fastened thereto.

The operator then draws the paper cover strip 40 in its entirety through the slot 42. This causes the film 35 to unwind itself and to pass through the gap 41 into the chamber 38 to be rolled up there. The feather 46 which extends to the circumference of the wound spool, bears lightly there against and provides a wedge to separate the free end of the film 35 from the strip 40; it thus prevents the film from simply rotating in the chamber 37 and, instead, directs it into the gap 41 from where it proceeds into the chamber 38.

The operator continues drawing of the cover strip 40 until the far end thereof is reached to which conventionally the end of the film 35 is glued, and pulls further until that end of the film also projects through the slot 42 to the exterior of the casing 31. Thereupon, the operator severs the paper cover strip 40 from the film 35 and discards the cover. By the pulling out of the strip 40, the film has been rolled up in the chamber 38 and extends through the gap 41 and the slot 42 and projects with one free end for a small portion therefrom on the outside of the casing 31, as best shown in Fig. 11.

The operator then inserts the film holder into the opening 28 of the cover 23 and proceeds to draw the film from the holder onto the carrier 27 as will presently be explained.

The carrier 27, as best shown in Figs. 3, 4 and 12 comprises two parallel carrier members 48 and 49 that are symmetrically arranged and spaced from each other.

Each member is spiral shaped and a spiral slot 51 separates the portions of the member radially from each other. The center portion 52 of each spiral member is rigidly mounted on a hollow shaft 53 that is rotatable in opposite directions and extends through the cover 23 and carries on the exterior of the cover a handle 54 that serves at the same time as a funnel for pouring liquids into the hollow shaft 53. The shaft 53 is provided with openings 56 for discharge of the liquids into the interior of the tank 21.

The portions that may be termed "ring portions" of each spiral member are flexible and resilient. A deflector 57 is provided for the member 48 and a deflector 58 is provided for the member 49. The two deflectors are opposite each other and are interconnected by means of two connecting pieces 59 and 61 to form with the deflectors a rectangular frame 60 that is secured to the cover 23 at 62 and at other desirable points (not shown).

Each deflector is adapted either to deflect portions from the normal plane of the member, or to release successive portions thereof to return to the normal plane, depending upon the direction of rotation of the shaft 53 and therefore of the member as it turns with the shaft. Each spiralic member has a free end 63 that is bent outwardly, as best shown in Fig. 5, in order to be engaged by the deflector. For instance in the view shown in Fig. 4 the spiral is being turned clockwise and the end 63 and the first and second ring portions of the spiral have passed over the deflector 57 while the remaining portions of the spiral are still disposed on the inside of the deflector 57. As the clockwise rotation continues, the deflector 57 will wedge itself further into the spiral slot 51 until all the ring portions of the spiral 48 are located on the exterior of the deflector 57.

It will be understood that the term "exterior" and the term "interior" are used herein relative to the deflector frame 60.

As shown in Fig. 4, the end 63 passes the deflector on the exterior thereof at both sides relative to the center portion 52. After all of the spiral is disposed on the exterior of the deflector, due to continuous clockwise rotation until that position is reached, only the center portions 52 of the spiral members will be in the normal plane thereof and will be spaced for a certain minimum distance from each other. This minimum distance equals a distance slightly smaller than the width of the film to be used with this mechanism and tank, and the remainder of the spiral members are spaced for a distance greater than the width of the film, due to their deflection, for clearing the film when it is being wound on the spirals.

Stops 64 are provided to limit the clockwise rotation (Fig. 4) of the spirals, and the rotation in the opposite direction is limited by the free ends 63 that are outward bent and are brought to a stop when they come in contact with lugs 66 that are provided at the deflectors.

A pin 67 is mounted on the center portions 52 of the spirals and is rotatable therewith and carries a flexible band 68 to which is secured a clamp 69 of conventional type at the free end thereof. Two spacers 71 are each interconnected to a center portion 52 and are rotatable therewith and serve to support the band 68 in spaced relation from the shaft 53.

After the film holder 26 has been inserted in the opening 28 of the cover 23 as related in the foregoing, and the shaft 53 been turned clockwise (Fig. 4) to a stop, the operator will engage with the clamp 69 the free end of the film 35 that projects from the holder. Thereafter, the cover carrying the mechanism and film is mounted on the closure structure 22, and the development tank is ready for operation to draw the film from the holder onto the spiral members.

The operator then rotates the shaft and thereby the spiral members in a counter-clockwise direction (Fig. 4), thereby drawing the film from the holder. The film, as best shown in Fig. 13, will come to lie with its lateral edges against the innermost portion of the spiral members 48 and 49 which portion is aligned with the film. Subsequently, as the spiral members are rotated counter-clockwise, succeeding portions of each spiral will be released by the corresponding deflector and be aligned with the film until finally the entire film is placed on the inner edges of the slots 51 against the spiral portions of the members. After the entire film has been drawn out from the film holder, the counter-clockwise movement is stopped by the free ends 63. The spiral members are so dimensioned that the entire film length will be carried by the carrier when the free ends 63 abut against the lugs 66 to terminate the winding movement.

Different spirals have to be used for different film lengths and the spirals may be marked with conventional commercial identifications of film lengths such as No. 127, 120, etc. For different films the spiral members also will have to be spaced from each other for different distances, which may be easily accomplished by well known conventional adjusting means, but which is neither shown in the drawings nor being described in detail herein.

The entire film is thus supported by the carrier in spiral manner and no portion of the film emulsion makes contact with any object. The film is now ready to be developed, and the operator will pour developing liquid into the funnel shaped knob 54 from where the liquid proceeds to the interior of the hollow shaft 53 and is discharged through the holes 56 into the tank. The liquids may be removed from the tank by draining through a hole 72 that is normally plugged, and other liquids may then be poured into the tank in similar fashion to complete the development of the film.

After the film has been withdrawn from the film holder 26, the latter is shifted from the tank until the shoulder 29 abuts against the cover 23; this is done to prevent the entry of chemical liquid into the holder 26 by way of the slot 42 thereof. After the liquid is drained from the tank, the holder 26 may again be returned to a position within the tank.

It will be apparent to those skilled in the art that the novel principles of the invention disclosed herein in connection with specific exemplifications thereof will suggest various other modifications and applications of the same. It is accordingly desired that in construing the breadth of the appended claims they shall not be limited to the specific exemplifications of the invention described herein.

Having thus described the invention, what I claim as new and desire to be secured by Letters Patent, is as follows:

1. In a daylight developing apparatus for exposed photographic films, in combination, a tank of light-impermeable wall structure having an opening, a revoluble film carrier turnable from the exterior of said tank and positioned in the interior thereof to receive a film for suspension, light shielded conduit means for developing fluids extending to the interior of said tank, a film holder projecting through said opening and being closely surrounded thereby and arranged to enclose light-impermeably a film holding chamber having a longitudinal light-shielded slot for film withdrawal, and a flange extending laterally from said film holder and normally disposed inside said tank, said film holder normally being reciprocably movable for a distance in excess of the length of said slot between an active position, wherein said slot is disposed entirely within said tank and in register with said carrier for film transfer thereto, and an inactive position, wherein said slot is removed entirely from the inside of said tank to preclude entry through the slot into said chamber of developing fluids subsequently discharged into said tank, said flange adapted in said inactive position to abut from the inside against the wall of said tank adjoining said opening for restraining complete removal of said film holder off said tank to seal the interior of the tank against the entry of light through said opening.

2. In a daylight developing apparatus for exposed photographic films, in combination, a tank of light-impermeable wall structure having a profiled opening, a revoluble film carrier turnable from the exterior of said tank and positioned on the interior thereof to receive a film for suspension, light shielded conduit means for developing fluids extending to the interior of said tank, a film holder having an outer contour substantially corresponding to said profile and projecting through said opening and being closely surrounded thereby and arranged to enclose light-impermeably a film holding chamber having a longitudinal light-shielded slot for film withdrawal, and a flange extending laterally of said contour from said film holder and normally disposed inside said tank, said film holder normally being reciprocably movable for a distance in excess of the length of said slot between an active position, wherein said slot is disposed entirely within said tank and in register with said carrier for film transfer thereto, and in inactive position, wherein said slot is removed entirely from the inside of said tank to preclude entry through the slot into said chamber of developing fluids subsequently discharged into said tank, said flange adapted in said inactive position to abut from the inside against the wall of said tank surrounding said opening for restraining complete removal of said film holder off said tank to seal the interior of the tank against the entry of light through said opening.

3. In a daylight developing apparatus for exposed photographic films, in combination, a tank of light-impermeable wall structure having an opening, a revoluble film carrier turnable from the exterior of said tank and positioned in the interior thereof to receive a film for suspension, light shielded conduit means for developing fluids extending to the interior of said tank, a film holder projecting through said opening and being closely surrounded thereby and arranged to enclose light-impermeably a film holding chamber having a longitudinal light-shielded slot for film withdrawal, and a flange extending laterally from said film holder and normally disposed inside said tank, said film holder normally being reciprocably movable for a distance in excess of the length of said slot between an active position, wherein said slot is disposed entirely within said tank and in register with said carrier for film transfer thereto, and an inactive position, wherein said slot is removed entirely from the inside of said tank to preclude entry through the slot into said chamber of developing fluids subsequently discharged into said tank, said flange adapted in said active position to rest against a wall of said tank opposite said opening to define the registry location of said slot and arranged in said inactive position to abut from the inside against the wall of said tank adjoining said opening for restraining complete removal of said film holder off said tank to seal the interior of the tank against the entry of light through said opening.

4. In a daylight developing apparatus for exposed photographic films, in combination, a tank of light-impermeable wall structure having an opening, a revoluble film carrier turnable from the exterior of said tank and positioned in the interior thereof to receive a film for suspension, light shielded conduit means for developing fluids extending to the interior of said tank, a film holder projecting through said opening and being closely surrounded thereby and comprising a tight closure carrying elongated casing surrounding a chamber adapted to receive on the interior a spool including a film wound thereon having a free end and an adjacent flexible protecting cover, said casing having for a portion of its length a longitudinal slot for successive removal from said chamber of said cover and said film, means within said casing for guiding said film to be rolled when said cover is severed from said film by drawing the cover through said slot and including a wedge for separating the free end of said film from said cover and a curvature disposed in said chamber for forcing said film to be wound into a spool-free roll, and a flange extending laterally from said film holder and normally disposed inside said tank, said film holder normally being reciprocably movable for a distance in excess of the length of said slot between an active position, wherein said slot is disposed entirely within said tank and in register with said carrier for film transfer thereto, and an inactive position, wherein said slot is removed entirely from the inside of said tank to preclude entry through the slot into said chamber of developing fluids subsequently discharged into said tank, said flange adapted in said inactive position to abut from the inside against the wall of said tank adjoining said opening for restraining complete removal of said film holder off said tank to seal the interior of the tank against the entry of light through said opening.

5. In a daylight developing apparatus for exposed photographic films, in combination, a tank of light-impermeable wall structure having an opening, a revoluble film carrier turnable from the exterior of said tank and positioned in the interior thereof to receive a film for suspension, light shielded conduit means for developing fluids extending to the interior of said tank, a film holder projecting through said opening and being closely surrounded thereby and comprising a casing adapted to be closed to be impermeable to outside light, a partition disposed on the interior of said casing and extending therein for a portion of the width of said casing to divide the interior into two intercommunicating longitudinal adjacent chambers having a longitudinal film passage therebetween, said casing having a slot and extending between one of said chambers and the exterior of said casing, said first chamber arranged to receive and to hold said film carrying spool and said slot arranged to receive said free end of said cover strip to be slid thereinto when said spool is placed in said first chamber for causing unwinding of said spool in said first chamber by drawing said strip through said slot to the exterior of said casing, means adjacent said slot to block the entry of light through said slot, means adapted to guide the film into the film passage to pass therethrough to the second chamber, and a flange extending laterally from said film holder and normally disposed inside said tank, said film holder normally being reciprocably movable for a distance in excess of the length of said slot between an active position, wherein said slot is disposed entirely within said tank and in register with said carrier for film transfer thereto, and an inactive position, wherein said slot is removed entirely from the inside of said tank to preclude entry through the slot into said chambers of developing fluids subsequently discharged into said tank, said flange adapted in said inactive position to abut from the inside against the wall of said tank adjoining said opening for restraining complete removal of said film holder off said tank to seal the interior of the tank against the entry of light through said opening.

6. In a daylight developing apparatus for exposed photographic films, in combination, a tank of light-impermeable wall structure having an opening, a revoluble film carrier turnable from the exterior of said tank and positioned in the interior thereof to receive a film for suspension and comprising a hollow shaft rotatable in opposite directions, means for connecting an end of film with relation to said shaft, two oppositely disposed spiral film support members spaced from each other and each flexible to be deflected from the path of said film between said members and resilient to return into said path after the deflecting force ceases, two deflectors each adjacent a member and adapted to deflect successive portions thereof when the shaft is rotated in a direction opposite to the film drawing direction and to release successive portions when said shaft is rotated in a film drawing direction, stops associated with said members for limiting the rotation of said shaft in either direction, said hollow shaft intercommunicating interiorly and light-impermeably with an opening of said tank and adapted to receive liquids for dispensing the same into the interior of said tank, draining means for emptying liquids from said tank, a film holder projecting through said opening and being closely surrounded thereby and arranged to enclose light-impermeably a film holding chamber having a longitudinal light-shielded slot for film withdrawal, and a flange extending laterally from said film holder and normally disposed inside said tank, said film holder normally being reciprocably movable for a distance in excess of the length of said slot between an active position, wherein said slot is disposed entirely within said tank and in register with said carrier for film transfer thereto, and an inactive position, wherein said slot is removed entirely from the inside of said tank to preclude entry through the slot into said chamber of developing fluids subsequently discharged into said tank, said flange adapted in said inactive position to abut from the inside against the wall of said tank adjoining said opening for restraining complete removal of said film holder off said tank to seal the interior of the tank against the entry of light through said opening.

ABE ALK.

REFERENCES CITED

The following references are of record in the file of this patent:

UNITED STATES PATENTS

| Number | Name | Date |
|---|---|---|
| 728,743 | Meek | May 19, 1903 |
| 1,893,092 | Liberman | Jan. 3, 1933 |
| 2,082,962 | Lesjak et al. | June 8, 1937 |
| 2,210,445 | Cerny et al. | Aug. 6, 1940 |
| 2,359,611 | Bolsey | Oct. 3, 1944 |

FOREIGN PATENTS

| Number | Country | Date |
|---|---|---|
| 600,567 | Germany | July 25, 1934 |
| 806,953 | France | Oct. 5, 1936 |